United States Patent [19]

Uchiyama et al.

[11] Patent Number: 5,781,322
[45] Date of Patent: Jul. 14, 1998

[54] METHOD AND APPARATUS FOR MEASURING THE NOISE FIGURE OF AN OPTICAL AMPLIFIER

[75] Inventors: Haruyoshi Uchiyama; Zhixien Li, both of Tokyo; Kazuo Aida, Yokohama, all of Japan

[73] Assignees: Ando Electric Co., Ltd.; Nippon Telegraph and Telephone Corporation, both of Tokyo, Japan

[21] Appl. No.: 696,074

[22] Filed: Aug. 13, 1996

[30] Foreign Application Priority Data

Aug. 15, 1995 [JP] Japan ............................ 7-208267

[51] Int. Cl.⁶ ........................................ H04B 10/00
[52] U.S. Cl. .................. 359/161; 359/110; 359/160; 359/337; 359/177
[58] Field of Search ........................ 359/110, 134, 359/160, 177, 184, 179, 187, 337, 341

[56] References Cited

U.S. PATENT DOCUMENTS 5,471,334  11/1995  Masuda et al. ................... 359/177
5,521,751  5/1996   Aida et al. ....................... 359/337
5,561,551  10/1996  Iwasaki et al. ................... 359/337
5,574,534  11/1996  Nogiwa et al. ................... 359/337

FOREIGN PATENT DOCUMENTS 7-226549  8/1995  Japan .

*Primary Examiner*—Knife-Michael Negash
*Attorney, Agent, or Firm*—Finnegan, Henderson, Farabow, Garrett & Dunner, L.L.P.

[57] ABSTRACT

An optical pulse signal produced by modulating a continuous laser light by means of a first pulse having a period sufficiently shorter than the atomic lifetime in the upper energy state of a rare earth doped fiber is input to an optical amplifier to be measured, while an output signal from the optical amplifier is modulated by a second pulse synchronized with the first pulse and having a phase difference relative to the first pulse which can be optionally set so that rapid phase adjustment relative to the first pulse is possible based on the phase at the time of minimum optical power. The noise figure of the optical amplifier is then measured based on, the maximum photoelectric power $(P_{AMP}+P_{ASE})$ and the minimum photoelectric power $P_{ASE}$ of the resultant optical signal.

4 Claims, 6 Drawing Sheets

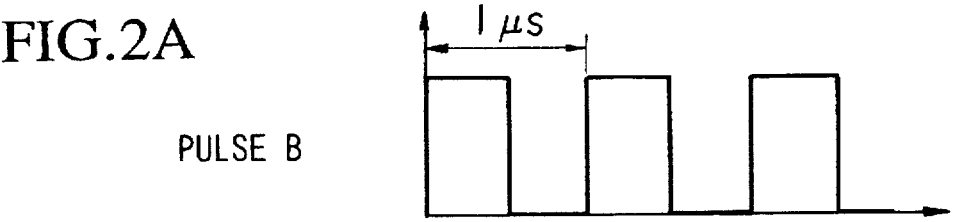
FIG.2A PULSE B
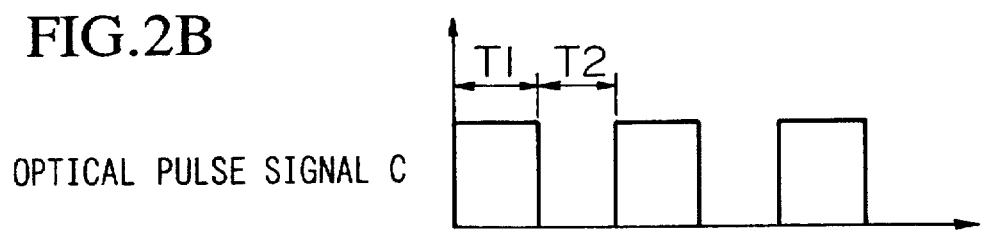
FIG.2B OPTICAL PULSE SIGNAL C
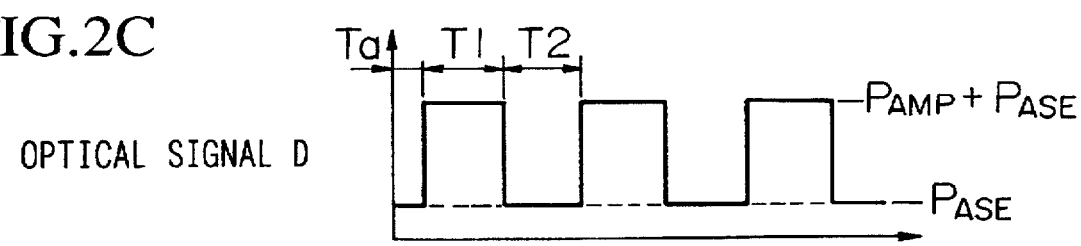
FIG.2C OPTICAL SIGNAL D
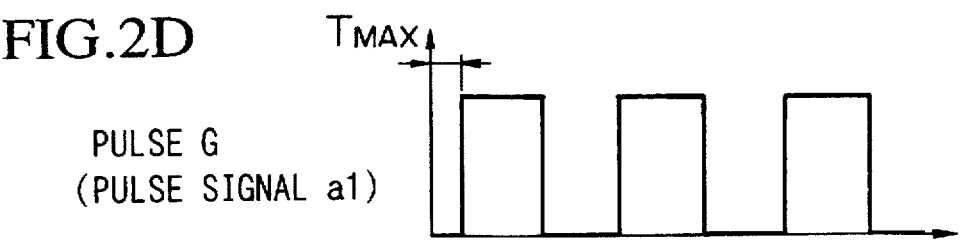
FIG.2D PULSE G (PULSE SIGNAL a1)
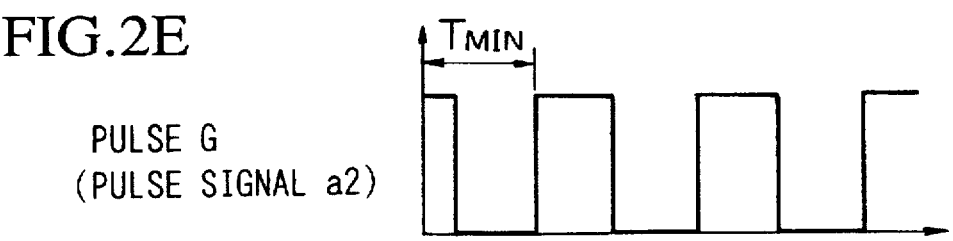
FIG.2E PULSE G (PULSE SIGNAL a2)

METHOD AND APPARATUS FOR MEASURING THE NOISE FIGURE OF AN OPTICAL AMPLIFIER

BACKGROUND OF THE INVENTION

1. Field of the Invention

The present invention relates to a method and apparatus for measuring the noise figure of an optical amplifier, and in particular to a method and apparatus which can carry out phase difference adjustment, quickly and easily and to a high accuracy.

2. Description of the Related Art

Light amplifiers which use an optical fiber to which has been added a rare earth element such as Erbium (atomic symbol Er) (referred to hereunder as a rare earth doped fiber), and optical amplifiers which use a semiconductor optical amplifying element are well known. With such optical amplifiers there is a noise figure in the parameter which determines their performance, and methods and apparatus for measuring this noise figure have been respectively developed.

When measuring the noise figure of an optical amplifier, a pulsed laser light having a period sufficiently shorter than the emission life of the amplifier spontaneous emission light (ASE light) is input to the optical amplifier which is being measured, and the output light from the optical amplifier is measured. This involves measuring the photoelectric power $P_{ASE}$ of the amplified spontaneously emitted light from the time region wherein the input laser light does not exist, and the photoelectric power ($P_{AMP}+P_{ASE}$) being the sum of the photoelectric power $P_{ASE}$ and the photoelectric power $P_{AMP}$ of the amplified laser light, in the time region wherein the laser light exists. The noise factor (NF) is then obtained by substituting the respective measured values in the following equation:

$$NF = (P_{ASE}/h \cdot \nu \cdot A \cdot B_0) + 1/A \tag{1}$$

Here h is the Planck's constant, $\nu$ is the optical frequency of the input laser light to the optical amplifier being measured, A is the gain of the optical amplifier, and $B_0$ is the transmission bandwidth of the measuring instrument used for measuring the photoelectric power $P_{ASE}$ of the spontaneously emitted light.

The gain A of the optical amplifier is approximated by the following equation:

$$A = (P_{AMP} - P_{ASE})/P_{IN} \tag{2}$$

Where $P_{IN}$ is the photoelectric power of the input laser light to the optical amplifier.

With the above-mentioned noise figure measuring apparatus, the pulsed laser light input to the optical amplifier is output after being delayed by the internal rare earth doped fiber, the delay time depending on the length thereof. With individual optical amplifiers, since the length of the rare earth doped fiber differs, then this delay time will have a different value depending on the optical amplifiers. Consequently, in measuring the noise figure, the total delay time including the delay due to the optical fiber connecting the noise figure measuring apparatus to the optical amplifier is pre-measured. The phase of the above-mentioned output light pulse is then adjusted relative to the switching phase of the pulsed laser light so that the output light from the optical amplifier is separated into time regions wherein there is no laser light and time regions wherein there is laser light, and then output.

With the above-mentioned noise figure measuring apparatus, the phase adjustment between the switching phase of the pulsed laser light and the pulse of the output light from the optical amplifier is carried out as follows.

The pulse for modulating and outputting the output light from the optical amplifier is synchronized with the pulse input to the optical amplifier for modulating the continuously output laser light. The maximum photoelectric power and the minimum photoelectric power are then detected from among the optical signals for one modulation period, obtained by successively increasing the phase difference between the two pulses. The photoelectric power of the amplified laser light and the spontaneously emitted light, and the photoelectric power of the spontaneously emitted light are then respectively measured and the phase of the pulses adjusted. At this time, in order to measure the noise figure of the optical amplifier to a higher accuracy, then the phase of the pulses must be set to an optimum value with minimal resolution within the possible settings. Consequently, with the phase adjustment, since the phase of the pulse is varied by the minimum phase setting spacing over a single modulation period, while measuring the output from the optical amplifier, the number of phase settings for the adjustment is considerable and the setting time also is long.

DISCLOSURE OF THE INVENTION

It is an object of the present invention to provide a method and apparatus for measuring the noise figure of an optical amplifier, which can quickly, easily and accurately carry out adjustment of the delay of the output signal from the optical amplifier due to a rare earth doped fiber inside the optical amplifier and the optical fiber for input/output of the optical signal to/from the optical amplifier, and can thus accurately measure the noise figure.

To achieve the above objects, the method of measuring the noise figure of an optical amplifier according to the present invention, wherein an optical pulse signal produced by modulating a continuous laser light by means of a first pulse having a period sufficiently shorter than the atomic lifetime in the upper energy state of a rare earth doped fiber is input to an optical amplifier to be measured, and an output signal from the optical amplifier is modulated by a second pulse synchronized with the first pulse and having a phase difference relative to the first pulse which can be optionally set, so that the noise figure of the optical amplifier can be measured, based on the maximum photoelectric power and the minimum photoelectric power of the measured optical signal, involves: changing the phase difference between the first pulse and the second pulse, and searching for a phase difference where the optical signal gives a minimum photoelectric power value, based on the changed phase differences and the photoelectric power of the light signal occurring at these phase differences; adjusting the phase of the second pulse relative to the first pulse so as to give the phase difference obtained from the search and measuring the minimum photoelectric power value, then computing a phase difference wherein the optical signal gives the maximum photoelectric power, based on the phase difference obtained by the search; and adjusting the phase of the second pulse relative to the first pulse so as to give the computed phase difference, and measuring the maximum photoelectric power value.

With the above-mentioned method of measuring the noise figure of an optical amplifier, the phase difference between the first and second pulses is changed, and then the phase difference between the first and second pulses giving the minimum photoelectric power value of the optical pulse modulated optical signal outputted from the optical amplifier is searched for based on the changed phase differences and the photoelectric power of the light signal occurring at the changed phase differences.

In this way, the number of phase settings can be significantly reduced compared to the conventional case wherein the minimum power value of the optical signal is searched for by changing the phase settings one by one over a single modulation period with the phase adjustment at the minimum phase setting spacing. Therefore, the delay of the output signal from the optical amplifier due to the rare earth doped fiber inside the optical amplifier and the optical fiber for input/output of the optical signal to/from the optical amplifier can be quickly, easily and accurately adjusted, thus enabling the measurement time for the noise figure to be greatly reduced.

BRIEF DESCRIPTION OF THE DRAWINGS

FIGS. 2A to 2E are a chart illustrating the timing of pulses at the various sections in the optical amplifier noise figure measuring apparatus;

DESCRIPTION OF THE PREFERRED EMBODIMENTS

As follows is a detailed description with reference to the drawings of embodiments of a method and apparatus for measuring the noise figure of an optical amplifier, according to the present invention.

Figure 1:
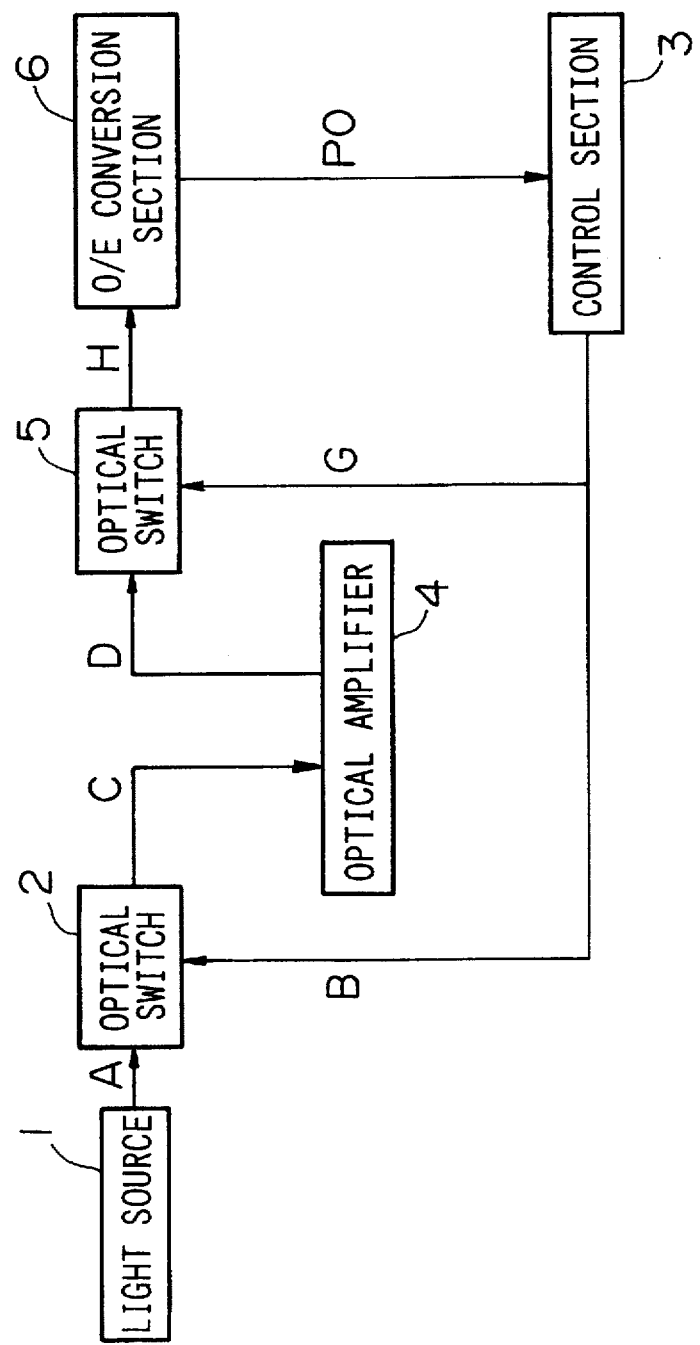
FIG. 1 is a block diagram showing a construction of an optical amplifier noise figure measuring apparatus according to an embodiment of the present invention.

FIG. 1 is a block diagram showing a construction of an optical amplifier noise figure measuring apparatus according to the present invention. In FIG. 1, a light source 1 is a DFB-LD, which continuously produces a laser beam A in the 1.55 micron band. An optical switch 2 changes the laser beam A into a light pulse signal C with a period of 1 micro second and a duty ratio of 50% using a pulse B supplied from a control section 3, and outputs this to an optical amplifier 4 (the object of measurement). The optical amplifier 4 is one which uses an $Er^{+3}$ doped fiber with 1.48 micron pumping. The optical amplifier 4 amplifies the light pulse signal C, and outputs this as an optical signal D.

The pulse B, the light pulse signal C and the optical signal D will now be explained with reference to FIGS. 2A–2E. In FIG. 2A, the period of the pulse B is set at 1 micro second so as to be a sufficiently shorter than the spontaneous emission life (a few micro seconds—several tens of micro seconds) of the $Er^{+3}$ doped fiber. With the light pulse signal C (FIG. 2B), a time interval T1 is the interval wherein the laser light exists, and a time interval T2 is the interval wherein there is no laser light. The optical signal D (FIG. 2C) is output after the occurrence of a delay of time Ta corresponding, for example, to the length of the optical fiber inside the optical amplifier 4. With the optical signal D, the amplified laser light and the spontaneously emitted light are output during the time interval T1, while only the spontaneously emitted light is output during the time interval T2. That is to say, during the time interval T1 the photoelectric power of the optical signal D is the sum of the photoelectric power $P_{AMP}$ of the amplified laser light and the photoelectric power $P_{ASE}$ of the spontaneously emitted light ($P_{AMP}+P_{ASE}$), while during the time period T2, this is only the photoelectric power $P_{ASE}$ of the spontaneously emitted light.

Returning to FIG. 1, an optical switch 5 modulates the optical signal D by means of a pulse G output from the control section 3, and then outputs this as an optical signal H. An O/E conversion section 6 detects the power $P_0$ of the optical signal H, and outputs an electrical signal to the control section 3.

The following is a description of the adjustment of the phase between the pulse B and the pulse G, required due to the delay Ta of the optical signal D.

Figure 3:
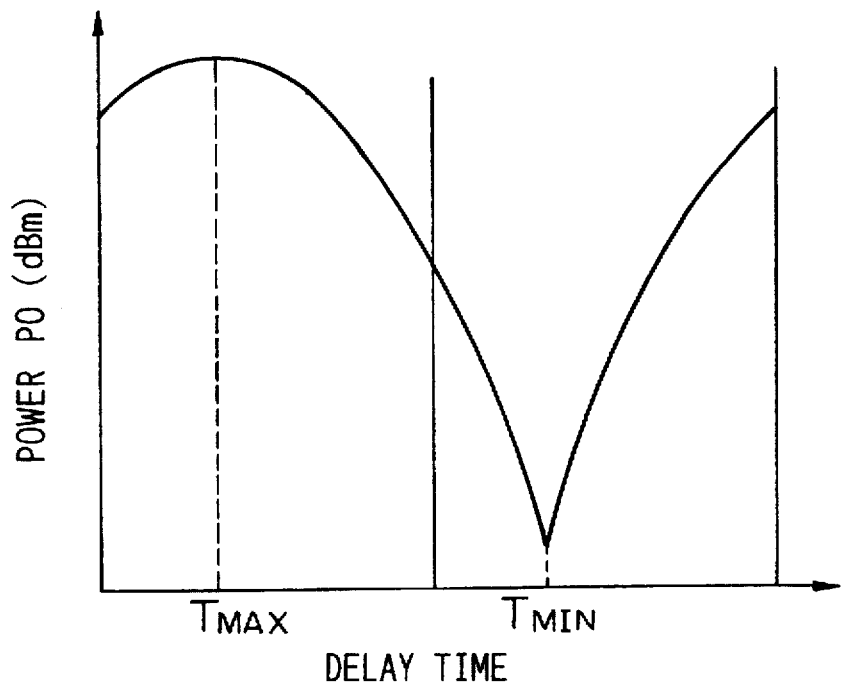
FIG. 3 is a graph showing the characteristics of the photoelectric: power of the optical signal in the optical amplifier noise figure measuring apparatus, obtained when the phase of a second pulse synchronized with a first pulse is varied.

FIG. 3 shows an example of the measured photoelectric power of the optical signal H when the phase difference between pulse B and pulse G is successively varied over a period of 1 micro second. With the phase setting of the pulse B and G, since the period of the pulses is 1 micro second, then if the minimum setting spacing for the phase difference between the pulses is 15.625 ns this gives 1 μs/15.625 ns=64. Hence a 64 pattern phase setting is possible. In FIG. 3, $T_{MAX}$ indicating the delay time giving the maximum photoelectric power is made the phase difference for measuring the photoelectric power of the laser light and the spontaneously emitted light, while $T_{MIN}$ indicating the delay time giving the minimum photoelectric power is made the phase difference for measuring the photoelectric power of the spontaneously emitted light. In general the delay time $T_{MAX}$ and the delay Ta of the optical signal D are approximately the same (refer to FIGS. 2C and 2D).

When obtaining $T_{MAX}$ and $T_{MIN}$, since $|T_{MAX}-T_{MIN}|=500$ ns (half the 1 micro second period), then $T_{MIN}$ and $T_{MAX}$ can be obtained by determining either one and correcting by half the period. In FIG. 3, compared to the gentle curve near the maximum value there is a sharp drop near the minimum value. Hence, accurate phase adjustment can be carried out by searching for and determining the phase difference $T_{MIN}$ at the minimum point.

An algorithm for the above-mentioned phase adjustment uses the example of when the characteristics of the photoelectric power relative to the delay time are as shown in FIG. 3. This is explained with reference to FIG. 4 through FIG. 6. At first, the power values $L_{L1}$, $L_{R1}$, and $L_{M1}$ (refer to FIG. 4) occurring at the respective phase differences are respectively measured at $T_{L1}$ for when the phase difference of the pulse B and the pulse G is 0, at $T_{R1}$ for when the phase difference of the pulse B and the pulse G is (1 μs–15.625 ns), and at a central phase difference $T_{M1}$ between $T_{L1}$ and $T_{R1}$.

The size relationship between the power value $L_{M1}$ at $T_{M1}$ and the power value $L_{L1}$ at $T_{L1}$ is then judged, and the positive or negative slope of the curve occurring at $T_{M1}$ is investigated by increasing by a single step phase difference (15.625 ns) from $T_{M1}$ while measuring the power value, and judging the size relationship between the measured power value and $L_{M1}$. If the measured power value is greater than $L_{M1}$, then the slope of the curve at $T_{M1}$ is positive, while if less than $L_{M1}$, the slope of the curve at $T_{M1}$ is negative.

After this, conditioning treatment as shown below is carried out depending on the size relationship between $L_{M1}$ and $L_{L1}$ and the negative/positive slope of the curve occurring at $T_{M1}$.

When $L_{Li}>L_{Mk}$, and the slope is negative, $T_{Mk}$ is made $T_{Li+1}$ and $L_{Mk}$ is made $L_{Li+1}$.

When $L_{Li}>L_{Mk}$, and the slope is positive, $T_{Mk}$ is made $T_{Rj+1}$ and $L_{Mk}$ is made $T_{Rj+1}$.

When $L_{Li}<L_{Mk}$, and the slope is negative, $T_{Mk}$ is made $T_{Rj+1}$ and $L_{Mk}$ is made $L_{Rj+1}$.

When $L_{Li}<L_{Mk}$, and the slope is positive, $T_{Mk}$ is made $T_{Li+1}$ and $L_{Mk}$ is made $L_{Li+1}$.

(where i=1, 2, 3 . . . , j=1, 2, 3 . . . , and k=1, 2, 3 . . . )

Figure 4:
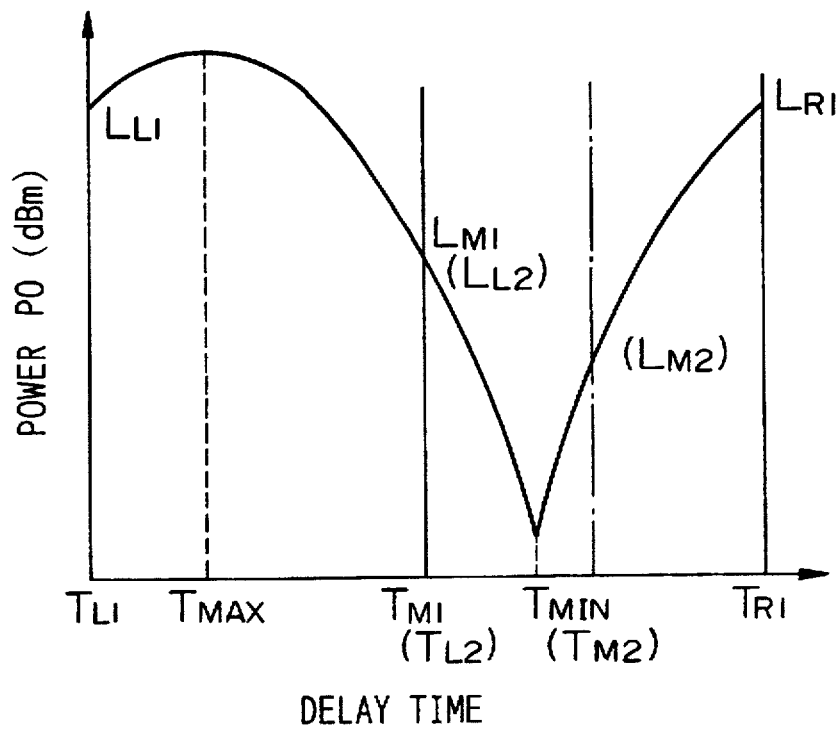
FIG. 4 is a diagram for describing an algorithm used when carrying out phase adjustment in the optical amplifier noise figure measuring apparatus.
Figure 5:
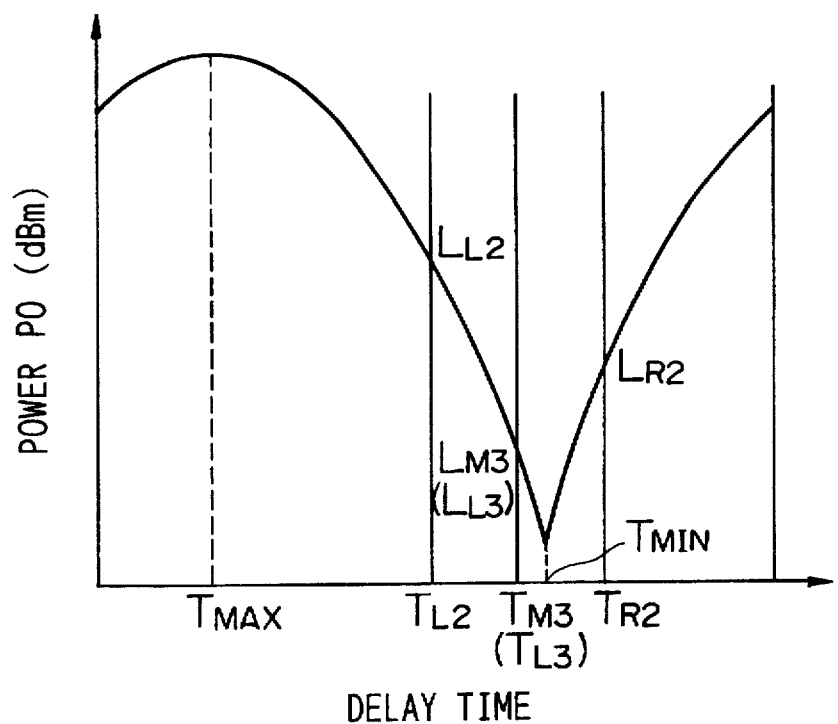
FIG. 5 is a further diagram for describing an algorithm used when carrying out phase adjustment in the optical amplifier noise figure measuring apparatus.

In FIG. 4, since $L_{L1}$ is greater than $L_{M1}$ and the slope of the curve at $T_{M1}$ is negative, then $T_{M1}$ is made $T_{L2}$ and $L_{M1}$ is made $L_{L2}$.

After this, the central phase difference between $T_{L2}$ and $T_{R1}$ is made $T_{M2}$, and the power value $L_{M2}$ occurring at $T_{M2}$ is measured. The size relationship between $L_{M2}$ and $L_{L2}$ is then judged, and the positive or negative slope of the curve occurring at $T_{M2}$ is investigated by increasing by a single step phase difference (15.625 ns) from $T_{M2}$ while measuring the power value, and judging the size relationship between the measured power value and $L_{M2}$.

A treatment the same as the above-mentioned conditioning treatment is then carried out using the results. That is to say, since in FIG. 4, $L_{L2}$ is greater than $L_{M2}$, and the slope of the curve at $T_{M2}$ is positive, then $T_{M2}$ is made $T_{R2}$ and $L_{M2}$ is made $L_{R2}$ (refer to FIG. 5). The central phase difference between $T_{L2}$ and $T_{R2}$ is then made $T_{M3}$, and the power value $L_{M3}$ occurring at $T_{M3}$ is measured.

The size relationship between $L_{M3}$ and $L_{L2}$ is then judged, and the positive or negative slope of the curve occurring at $T_{M3}$ is investigated. Since the result gives $L_{L2}$ greater than $L_{M3}$ and the slope of the curve at $T_{M3}$ is negative, then based on the above-mentioned conditioning treatment, $T_{M3}$ is made $T_{L3}$, and $L_{M3}$ is made $L_{L3}$.

Figure 6:
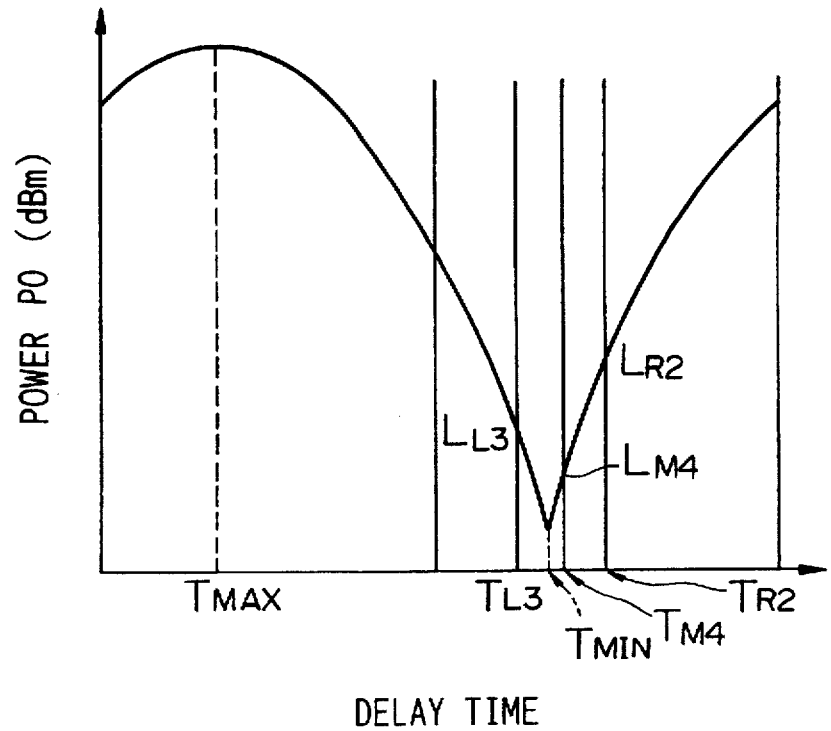
FIG. 6 is yet a further diagram for describing an algorithm used when carrying out phase adjustment in the optical amplifier noise figure measuring apparatus.

The central phase difference between $T_{L3}$ and $T_{R2}$ is then made $T_{M4}$, and the power value $L_{M4}$ occurring at $T_{M4}$ measured (refer to FIG. 6). After this the same operation is repeated until the spacing between $T_{Li}$ and $T_{Rj}$ becomes 15.625 ns. Finally the photoelectric power levels for $T_{Li}$ and $T_{Rj}$ are compared, with the lower level determining $T_{MIN}$.

Figure 7:
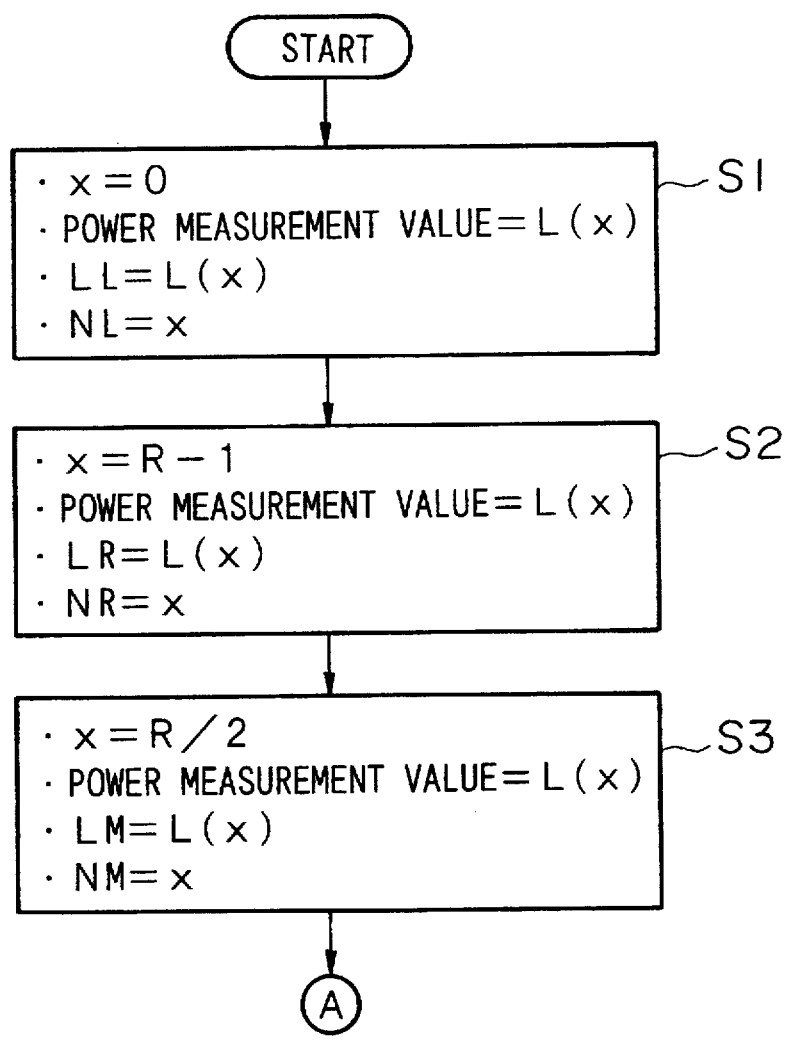
FIG. 7 is a flowchart illustrating details of the algorithm.
Figure 8:
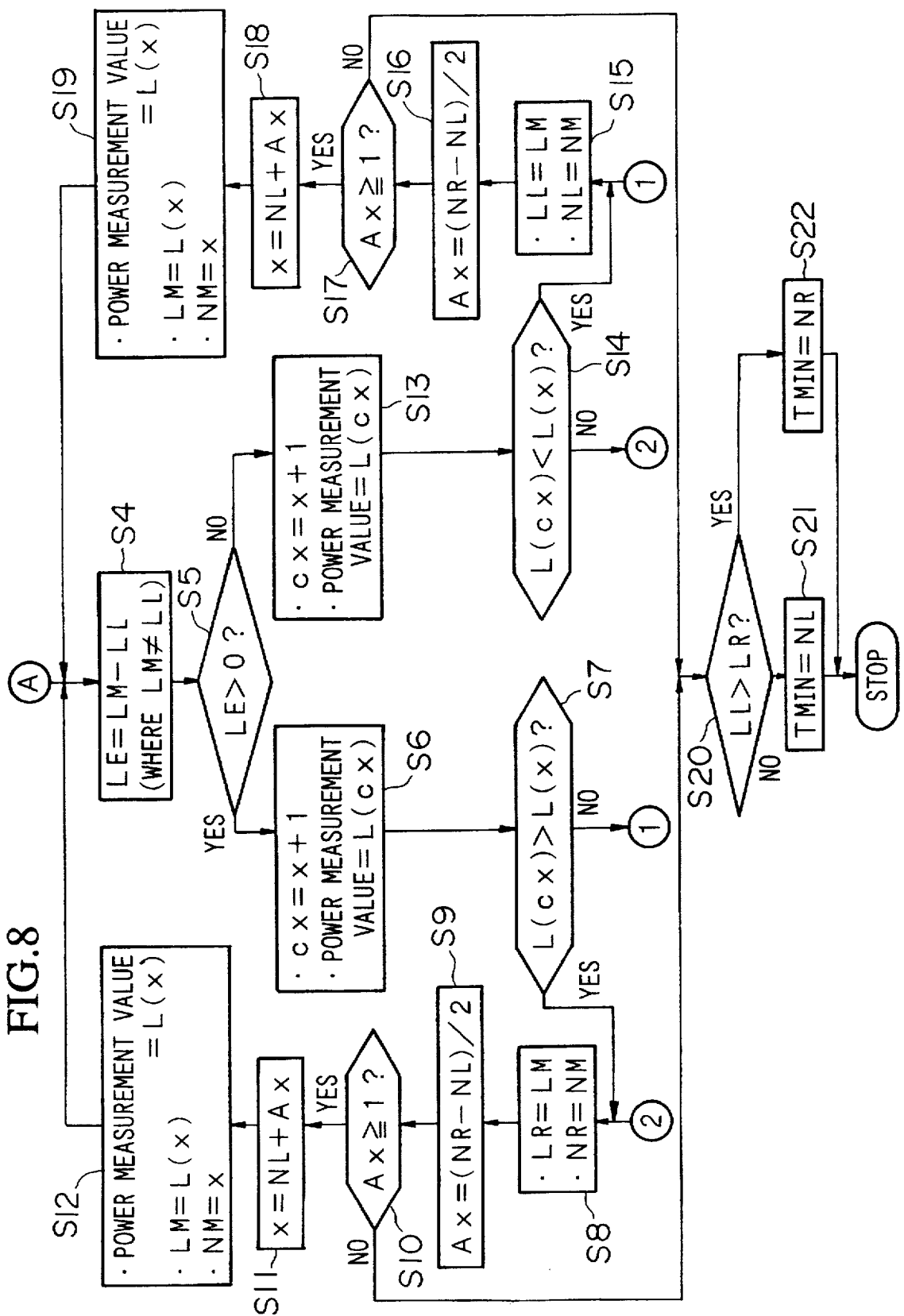
FIG. 8 is another flowchart illustrating details of the algorithm.

Details of the above-mentioned algorithm are shown in the flowcharts of FIG. 7 and FIG. 8. In FIG. 7 and FIG. 8, x is a phase setting value. For example if x=0 the phase difference between pulse B and pulse G is set to 0, while if x=1, the phase difference between pulse B and pulse G is set to 15.625 ns. Thereafter the phase difference between pulse B and pulse G is increased by 15.625 ns for each increase by 1 of the value of x. R is the maximum phase setting value, being 64 (at this time, the phase difference between pulse B and pulse G is 64×15.625 ns=1 μs).

With the above-mentioned method, $T_{MIN}$ can be obtained within 13 times compared to the conventional method which requires setting the phase difference 64 times.

Since from FIG. 2, the delay portion Ta≈$T_{MAX}$, then $T_{MAX}$, that is Ta, can be obtained by correcting $T_{MIN}$ by half the period (±500 ns).

The control section 3 therefore outputs a pulse B with a 1 micro second period and duty ratio of 50% to the optical switch 2, and outputs a pulse signal a1 delayed by Ta relative to pulse B to the optical switch 5 as a pulse G (refer to FIG. 2D). The output from the O/E conversion section 6 at this time is stored as P1.

After this, the control section 3 outputs as a pulse G to the optical switch 5, a pulse signal a2 delayed by 0.5 micro seconds relative to the pulse signal a1 (half the period of the 1 micro second period of pulse B) (refer to FIG. 2E). The output from the O/E conversion section 6 at this time is stored as P2. The output P1 and the output P2 are then substituted in the above-mentioned equations (1) and (2) as $P_{AMP}$ and $P_{ASE}$ respectively, and the noise figure NF then calculated.

While the present invention has been explained above in concrete terms based on the embodiments, needless to say the invention is not limited to the embodiments as disclosed above, and may be variously modified within the scope of the claims.

What is claimed is:

1. A method of measuring a noise figure of an optical amplifier, comprising the steps of:

(a) inputting into said optical amplifier an optical pulse signal produced by modulating a continuous laser light obtained by modulating a first pulse having a period sufficiently shorter than an atomic lifetime in an upper energy state of a rare earth doped fiber;

(b) modulating an optical signal output from said optical amplifier by a second pulse having a phase difference relative to said first pulse in a variable range over a single period of said first pulse, then converting a resulting optical signal into photoelectric power;

(c) determining an upper limit phase difference and a lower limit phase difference in the variable range of said phase difference between the first pulse and the second pulse;

(d) measuring a value of the photoelectric power when said phase difference between the first pulse and the second pulse is set at the lower limit phase difference;

(e) measuring a value of the photoelectric power when said phase difference between the first pulse and the second pulse is set at a central phase difference between the upper limit phase difference and the lower limit phase difference;

(f) detecting whether a slope of a characteristic curve of the value of the photoelectric power obtained by sequentially changing the phase difference between the first pulse and the second pulse is positive or negative at the central phase difference;

(g) setting the central phase difference to an upper limit phase difference or a lower limit phase difference depending on a magnitude of the measured photoelectric power values and whether the detected slope is positive or negative;

(h) repeating the above-recited steps (d) through (g), and when a difference between the upper limit phase difference and the lower limit phase difference becomes less than a minimum variable amount of the phase difference, taking the upper limit phase difference or the lower limit phase difference as a minimum phase difference at which the photoelectric power has a minimum value, and measuring a value of the photoelectric power at the minimum phase difference;

(i) determining a maximum phase difference at which the photoelectric power has a maximum value based on the minimum phase difference at which the photoelectric power has a minimum value; and (j) measuring the noise figure of said optical amplifier based on the minimum and maximum photoelectric power values from steps (h) and (i).

2. The method of measuring the noise figure of an optical amplifier in accordance with claim 1, wherein the detection of whether the slope of the characteristic curve is positive or negative in step (f) includes the substeps of measuring a value of the photoelectric power when the phase difference between the first pulse and the second pulse is increased by a minimum variable amount from the central phase difference, and determining the slope of the characteristic curve to be negative if the measured photoelectric power value is less than the photoelectric power value at the central phase difference, and positive if the measured photoelectric power value is greater than the photoelectric power value at the central phase difference.

3. The method of measuring the noise figure of an optical amplifier in accordance with either claim 1 or claim 2, wherein the determination of whether to set the central phase difference to an upper limit phase difference or a lower limit phase difference in step (g) includes the substeps of setting the central phase difference to the lower limit phase difference if the photoelectric power value measured in step (d) is greater than the photoelectric power value measured in step (e) and the slope is negative, setting the central phase difference to the upper limit phase difference if the photoelectric power value measured in step (d) is greater than the photoelectric power value measured in step (e) and the slope is positive, setting the central phase difference to the upper limit phase difference if the photoelectric power value measured in step (d) is less than the photoelectric power value measured in step (e) and the slope is negative, and setting the central phase difference to the lower limit phase difference if the photoelectric power value measured in step (d) is less than the photoelectric power value measured in step (e).

4. An apparatus for measuring a noise figure of an optical amplifier, said apparatus comprising:

optical signal generating means for generating a continuous optical signal;

first pulse modulating means for pulse modulating said continuous optical signal;

an optical amplifier to be measured, for receiving optical pulses output from said first pulse modulating means;

second pulse modulating means for pulse modulating an optical signal amplified by said optical amplifier;

photoelectric conversion means for converting an optical pulse output from said second pulse modulating means into photoelectric power; and measurement control means for supplying pulse modulated signals having an identical period to the first and second pulse modulating means, measuring a photoelectric power value output from said photoelectric conversion means with the phase difference between said pulse modulated signals in a period of the pulse modulated signals at each of a lower limit phase difference, an upper limit phase difference, and a central phase difference between the lower limit and upper limit phase differences, judging a larger value between a measured photoelectric power value at the lower limit phase difference and a measured photoelectric power value at the central phase difference, detecting whether the slope of a characteristic curve of the value of the photoelectric power obtained by sequentially changing the phase difference between the pulse modulated signals is positive or negative at the central phase difference, resetting the central phase difference to the upper limit phase difference or the lower limit phase difference depending on results of the judgment and whether the slope of the characteristic curve is positive or negative, determining a new central phase difference between the lower limit phase difference and the upper limit phase difference after a new upper limit phase difference or lower limit phase difference has been set by the resetting, measuring a photoelectric power value at the new central phase difference, repeatedly performing the judgment of whether the photoelectric power value measured at the central phase difference or measured at the lower limit phase difference is larger, and the determination of whether the slope of the characteristic curve is positive or negative, and the resetting of the upper limit phase difference or the lower limit phase difference, determining the upper limit phase difference or the lower limit phase difference to be a phase difference at which the photoelectric power output from said photoelectric conversion means is a minimum value when the difference between the upper limit phase difference and the lower limit phase difference is a minimum variable amount of the phase difference capable of being set, measuring the maximum photoelectric power value output from said photoelectric conversion means based on this phase difference, and measuring the noise figure of said optical amplifier to be measured based on the minimum photoelectric power value and the maximum photoelectric power value.

* * * * *